United States Patent
Kim

(10) Patent No.: US 7,966,339 B2
(45) Date of Patent: Jun. 21, 2011

(54) METHOD AND SYSTEM FOR GLOBALLY SHARING AND TRANSACTING CONTENTS IN LOCAL AREA

(75) Inventor: Sun-jin Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 640 days.

(21) Appl. No.: 11/301,033

(22) Filed: Dec. 13, 2005

(65) Prior Publication Data

US 2006/0129578 A1 Jun. 15, 2006

(30) Foreign Application Priority Data

Dec. 15, 2004 (KR) .................. 10-2004-0106445

(51) Int. Cl.
*G06F 17/30* (2006.01)
(52) U.S. Cl. ...................... 707/758; 707/793
(58) Field of Classification Search .............. 707/758, 707/793

See application file for complete search history.

(56) References Cited

U.S. PATENT DOCUMENTS

| | | | |
|---|---|---|---|
| 6,005,603 A | | 12/1999 | Flavin |
| 6,122,641 A | * | 9/2000 | Williamson et al. .......... 707/793 |
| 6,128,623 A | * | 10/2000 | Mattis et al. ................ 711/118 |
| 6,173,290 B1 | * | 1/2001 | Goldberg ..................... 707/687 |
| 6,289,358 B1 | * | 9/2001 | Mattis et al. ................ 707/695 |
| 6,629,104 B1 | * | 9/2003 | Parulski et al. .............. 382/307 |
| 6,745,176 B2 | * | 6/2004 | Probert et al. ............... 709/230 |
| 6,785,688 B2 | * | 8/2004 | Abajian et al. .............. 707/700 |
| 6,813,770 B1 | * | 11/2004 | Allavarpu et al. ........... 719/316 |
| 2003/0093790 A1 | | 5/2003 | Logan et al. |
| 2003/0221127 A1 | | 11/2003 | Risan et al. |
| 2004/0006767 A1 | | 1/2004 | Robson et al. |
| 2004/0078293 A1 | | 4/2004 | Iverson et al. |
| 2004/0139095 A1 | * | 7/2004 | Trastour et al. ............. 707/100 |
| 2005/0251725 A1 | * | 11/2005 | Huang et al. ................ 714/752 |
| 2006/0130118 A1 | * | 6/2006 | Damm ......................... 725/135 |
| 2007/0118577 A1 | * | 5/2007 | East ............................ 707/204 |

FOREIGN PATENT DOCUMENTS

| | | |
|---|---|---|
| CN | 1291853 A | 4/2001 |
| CN | 1411579 A | 4/2003 |
| JP | 11-250090 A | 9/1999 |
| JP | 2000-298603 A | 10/2000 |
| JP | 2002-074203 A | 3/2002 |
| JP | 2002-117272 A | 4/2002 |
| JP | 2002-123745 A | 4/2002 |
| JP | 2002-183506 A | 6/2002 |

(Continued)

OTHER PUBLICATIONS

Office Action dated Apr. 9, 2010 in Canadian Patent Application. No. 2591417.

(Continued)

*Primary Examiner* — Don Wong
*Assistant Examiner* — Kim T Nguyen
(74) *Attorney, Agent, or Firm* — Sughrue Mion, PLLC

(57) ABSTRACT

A method and system for globally distributing a service containing digital content are provided. The method includes receiving original content existing in each local area from at least one content provider, generating metadata in a first local language using the received original content, converting the metadata into a universal language, and transmitting the converted metadata and at least a portion of the original content to the global MSP.

23 Claims, 10 Drawing Sheets

FOREIGN PATENT DOCUMENTS

| | | |
|---|---|---|
| JP | 2003-018519 A | 1/2003 |
| KR | 2000/0072264 A | 12/2000 |
| KR | 1020020059212 A | 12/2002 |
| KR | 2003-0019964 A | 3/2003 |
| KR | 10-2004-0053554 A | 6/2004 |
| WO | WO 02/47362 A2 | 6/2002 |
| WO | WO 02/063495 A1 | 8/2002 |

OTHER PUBLICATIONS

Canadian Office Action, dated Feb. 3, 2011, issued in Application No. 2591417.

* cited by examiner

| ID NO. | CONTENT TYPE | TITLE | GENRE | FILE TYPE | LANGUAGE | FILE SIZE | LENGTH | RIGHT-HOLDER | CREATION DATE | DATA POSITION | PRICE |
|---|---|---|---|---|---|---|---|---|---|---|---|
| 221-1-501 | VIDEO | THREE FRIENDS | DRAMA | avi | KOREAN | 1GB | 1'10" | MBC | 040730 | KOREAN MSP | $ 20 |
| 221-1-502 | AUDIO | THREE FRIENDS | DRAMA | mp3 | KOREAN | 10MB | 1'10" | MBC | 040730 | MASTER MSP | $ 5 |
| 221-1-503 | SCRIPT | THREE FRIENDS | DRAMA | Doc | KOREAN | 3MB | 3,000단어 | MBC | 040730 | MASTER MSP | $ 1 |

FIG. 6

```xml
<?xml version="1.0" encoding="euc-kr"?>
    <content type="moving picture">
        <title> THREE FRIENDS </title>
        <genre> DRAMA </genre>
        <file type> AVI </file type>
            .
            .
            .
        <price> $20 </price>
</content>
<content type="audio">
        <title> THREE FRIENDS </title>
        <genre> DRAMA </genre>
        <file type> MP3 </file type>
            .
            .
            .
        <price> $5 </price>
</content>
<content type="scrypt">
        <title> THREE FRIENDS </title>
        <genre> DRAMA </genre>
        <file type> DOC </file type>
            .
            .
            .
        <price> $1 </price>
</content>
```

METHOD AND SYSTEM FOR GLOBALLY SHARING AND TRANSACTING CONTENTS IN LOCAL AREA

CROSS-REFERENCE TO RELATED APPLICATION

This application claims priority from Korean Patent Application No. 10-2004-0106445 filed on Dec. 15, 2004 in the Korean Intellectual Property Office, the disclosure of which is incorporated herein by reference in its entirety.

BACKGROUND OF THE INVENTION

1. Field of the Invention

The present invention relates to a method for globally distributing a service containing digital contents, and more particularly, to a system and method for globally sharing digital content owned by each local multi service platform (MSP) and associated metadata in a standardized format by allowing each local MSP to participate in a global MSP consisting of a master MSP acting as a global hub for distribution of digital content and a Solution Market Place.

2. Description of the Related Art

Advancement of Internet technology and proliferation of broadband communication have led to the distribution of digital contents. For example, a user can access the Internet on personal computer (PC), mobile phone, personal digital assistant (PDA), television (TV), or refrigerator to purchase contents including sound such as bell ring/music, pictures, motion video, Avata, or other various information or use on-line services such as Internet banking and booking. The user is also allowed to purchase a restricted range of contents originating in other countries or networks via the Internet. However, the range of contents retrievable is too restricted for a user to freely purchase the contents being sold in other countries.

FIG. 1 shows a conventional digital content transaction system. Referring to FIG. 1, the digital content transaction system includes a digital content provider server 11, a service provider server 12 receiving digital contents and providing the received digital contents to a consumer, a consumer terminal 13 purchasing digital contents, and a telecommunications service provider server 14 providing a transmission medium connecting each storage medium with a terminal.

The digital content provider server 11 includes a digitizing unit for digitalizing analog contents, a storing unit for storing digital contents, a transmitting unit (compression and communication unit) for enabling transmission of digital contents via the Internet, and a controlling unit for comprehensively controlling various activities including the classification, storage, retrieval, compression and transmission of contents. The digital content provider server 11 generates and digitizes contents and provides the contents to the service provider server 12 that then provides the contents to a consumer. Digitization of the contents may be performed by the service provider server 12 as well.

The service provider server 12 includes a retrieving unit investigating/collecting digital contents, a storing unit receiving contents from the content provider server 11 and storing the received contents, a digitizing unit digitizing contents as needed, a classifying unit classifying contents, a network interface connecting a consumer to contents, a content providing unit for delivering contents to a consumer through a download or streaming function. For example, when the service provider server 12 is a web server, the service provider server 12 collects and stores contents, displays the contents so that a consumer can access and download the contents on a web through a browser, and sells contents to a consumer.

The digital content consumer terminal 13 may be a PC connected to the Internet or a mobile phone. The consumer terminal 13 includes a receiving unit searching for digital contents and receiving the retrieved contents through downloading or other methods and a content activating unit playing sound or motion video or setting pictures as wallpaper. A digital content consumer searches for and selects contents and executes a purchase command for the selected contents through the terminal 13.

The telecommunications service provider server 14 provides network equipment that enables content transfer among a service provider, a content provider, and a consumer. For example, wired/wireless telephone communication service provider and wired/wireless telephone communication service provider construct the server 14 to provide services that enable communication between the service provider server 12 and the consumer terminal 13.

Digital content distribution based on the architecture of the conventional system is individually made by industry, local service provider and content provider, and terminal. In a conventional content transaction process, a consumer accesses a site (various portal sites, electronic content on-line shopping malls, one-line movie theater, etc) of a service provider who owns his/her desired content through a network of a selected telecommunications service provider and selects and purchases the desired content. The service provider collects contents through agreements with various content providers and provides the collected contents to consumers.

The conventional digital content distribution method makes it difficult for a consumer to access content. When the consumer desires to use a specific content, he/she must directly search a web portal site for a service provider who owns the content and visit the web site of the service provider to check if the desired content is provided. Thus, if the web site does not provide the desired content, the consumer must visit another web site.

Second, contents and services are separately designed for different geographical locations, cultures, and languages. A consumer mostly accesses content originating in foreign countries via the Internet using a PC. However, the consumer encounters difficulty in using the foreign content due to the difficulty in understanding language and content classification system. Global distribution is made for an extremely restricted range of contents.

Third, the conventional digital content distribution method suffers inconvenience in use because a service being provided is highly dependent on a terminal. For conventional distributed digital contents, because the type of services available varies according to the type of a terminal (e.g., a PC, a mobile phone, a television, etc.), a user interface, a transmission channel, content type, and content format are different for each terminal type. Thus, to purchase desired content, a consumer must access a service that provides the desired content only through a specific device. Sharing of the same content between devices is limited to specific cases such as transmission of images and music between PC and mobile phone.

Fourth, since a content provider and a service provider need to separately design or individually customize contents according to the specification of each terminal, the conventional digital content distribution method involves repetitive processes. For a conventional content platform, content must be designed separately or customized for each specific device so that content designed according to the specification of a specific device can be run on the device. Thus, these repetitive processes cause inefficiency.

SUMMARY OF THE INVENTION

The present invention provides a method and system for globally sharing content in real time by providing a digital content independently existing on a local area in the form of an integrated solution that creates added value through meta-database (meta-DB) systems of a local multi service platform (MSP), a master MSP, and a solution market place that interwork with a plurality of devices and by standardizing the classification system, transaction type, content format, design method, and compression method of a digital content that vary by local area.

The present invention also provides a method and system for allowing a digital content consumer to conveniently search for and access various global contents and services without restriction to a terminal type using global real-time sharing of digital content while allowing a service provider to provide content by minimizing an unnecessary repetitive process.

The above stated object as well as other objects, features and advantages, of the present invention will become clear to those skilled in the art upon review of the following description.

According to an aspect of the present invention, there is provided a method for globally sharing content in local area by interworking with a global multi service platform (MSP), including the steps of receiving original content existing in each local area from at least one content provider, generating metadata in a first local language using the received original content, converting the metadata into a universal language, and transmitting the converted metadata and at least a portion of the original content to the global MSP.

According to another aspect of the present invention, there is provided a method for globally transacting content in local area by interworking with a global multi service platform (MSP), the method including receiving overall metadata from the global MSP, a terminal selecting one of contents represented by the overall metadata, sending a purchase request for the selected content to the global MSP, receiving the requested content from the global MSP, and providing the received content to the terminal.

According to still another aspect of the present invention, there is provided a method for globally sharing and transacting content existing in a local multi service platform (MSP) by interworking with at least one local MSP, the method including receiving metadata in a universal language and all or a portion of content represented by the metadata from the local MSP, converting the metadata into metadata written in a predetermined local language, converting the received content into content in the local language, providing overall metadata including at least the converted metadata to the local MSP, receiving a request for content represented by the overall metadata from a first local MSP of the at least one local MSP, and transmitting the requested content to the first local MSP.

According to a further aspect of the present invention, there is provided a method for globally sharing and transacting content in local area, including receiving content from a content provider in the local area, registering the received content with a global area, generating metadata using the received content and converting the metadata into a universal language to generate global metadata, converting the global metadata into various local languages and generating local metadata, sharing the global metadata and the local metadata, receiving a transaction request for content represented by the shared metadata, and selecting the requested content from the registered contents and transmitting the selected content.

According to yet another aspect of the present invention, there is provided a local multi service platform (MSP) for globally sharing content in local area by connecting to a global MSP, the local MSP including a receiving unit receiving original content existing in each local area from at least one content provider, a metadata generating unit generating metadata in a first local language using the received original content, a language converter converting the metadata into a universal language, and a transmitter transmitting the converted metadata and at least a portion of the original content to the global MSP.

According to a further aspect of the present invention, there is provided a local multi service platform (MSP) for globally transacting content in local area by connecting to a global MSP, the local MSP including a means for receiving overall metadata from the global MSP, a means for allowing a terminal to select one of contents represented by the overall metadata, a means for sending a purchase request for the selected content to the global MSP, a means for receiving the requested content from the global MSP, and a means for providing the received content to the terminal.

According to yet a further aspect of the present invention, there is provided a global multi service platform (MSP) for globally sharing and transacting content for each local area existing in a local multi service platform (MSP) by interworking with at least one local MSP, the global MSP including a means for receiving metadata in a universal language and all or a portion of content represented by the metadata from the local MSP, a means for converting the metadata into metadata written in a predetermined local language, a means for converting the received content into content in the local language, a means for providing overall metadata including at least the converted metadata to the local MSP, a means for receiving a request for content represented by the overall metadata from a first local MSP of the at least one local MSP, and a means for transmitting the requested content to the first local MSP.

BRIEF DESCRIPTION OF THE DRAWINGS

The above and other features and advantages of the present invention will become more apparent by describing in detail exemplary embodiments thereof with reference to the attached drawings in which:

FIG. 6 shows an example in which the metadata of FIG. 5 is created in an Extensible Markup Language (XML) file;

DETAILED DESCRIPTION OF THE INVENTION

Figure 1:
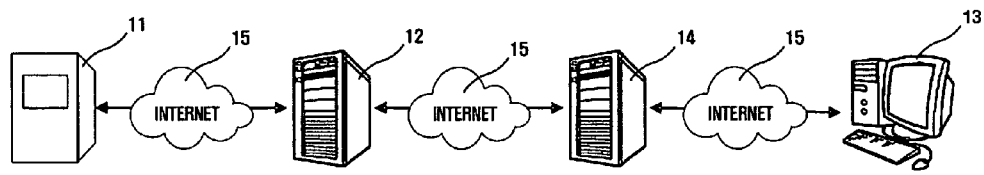
FIG. 1 shows a conventional digital content transaction system.

The present invention will now be described more fully with reference to the accompanying drawings, in which exemplary embodiments of this invention are shown. Advantages and features of exemplary embodiments of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings, in which exemplary embodiments of the invention are shown.

In an exemplary embodiment of the present invention, each multi service platform (abbreviated as "MSP") participates in a global MSP consisting of a master MSP acting as a global hub for distribution of digital content and a solution transaction server and globally shares metadata for its own digital content in a standardized format with another local MSP. Hereinafter, a "global sharing" can be understood as including a plurality of local MSPs instead of worldwide sharing. Thus, if each city corresponds to a local area, a nation including multiple cities may be a global area.

Unlike a conventional distribution approach whereby each local MSP provides its subscribers with its own digital content as well as a restricted range of contents originating in foreign countries or other networks, an exemplary embodiment of the present invention allows subscribers of each local MSP to go beyond the boundary of digital content owned by the local MSP and efficiently access various global contents within a global MSP. An exemplary embodiment of the present invention also provides a method and system for globally distributing contents designed to easily process activities associated directly or indirectly with global distribution such as advertising, merchandising, billing, and copyright related matters in an integrated manner, which were conventionally performed individually upon purchase of external contents.

A MSP refers to a system that allows classification, storage, execution, and management of all available services (including contents) that can be digitalized and global distribution of content and services through association between different MSPs. The detailed concept of MSP will now be described. "Multi" in the MSP means providing any content requested by a consumer through the most suitable channel without restriction to media, i.e., regardless of the type of terminal used by an end user. A "service" is a broad term including a solution and refers to tangible or intangible products that fit consumer's request or needs in a satisfactory way in return for transaction. A "platform" includes an infrastructure supported to remove overlapping/repetitive elements while providing multi service to a consumer and meet various and complicated consumer's needs in a timely manner.

Here, a "solution" includes to a service simultaneously providing a system and associated service. A home network solution refers to a solution in which various daily convenience services are provided through internetworking among multiple terminal devices including TV, refrigerator, washing machine, robot cleaner, locking device on the front door, gas valve, oven, electric curtain, lighting, coffee port, audio player, and mobile phones when a specific condition predefined by a user is met. For example, a lighting in the living room and TV are turned on and an oven and a washing machine begin to operate when a user returns home. That is, the home network solution is considered as a solution that provides a system such as terminal devices and networks together with customized services.

Figure 2:
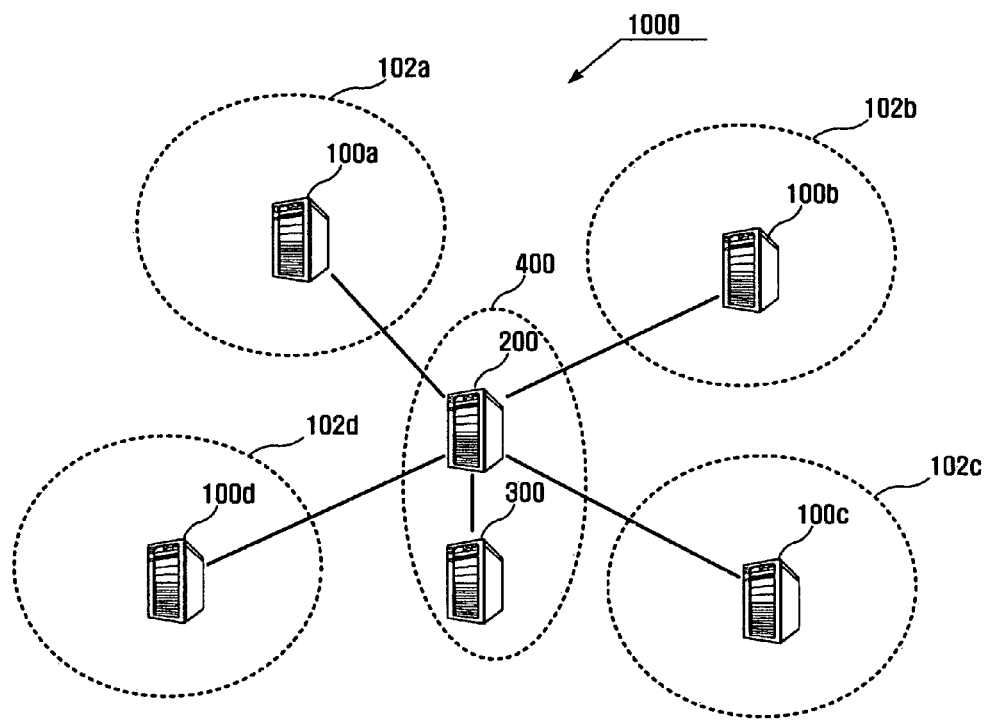
FIG. 2 shows the entire digital content transaction system according to an embodiment of the present invention.

Referring to FIG. 2, a digital content transaction system 1000 includes local MSPs 100a through 100d acting as hubs of corresponding local content transaction systems 102a through 102d, a master MSP 300 creating and managing a global standard for all contents provided by the local MSPs 100a through 100d, and a solution transaction server 200 supporting transaction and cooperation among the local MSPs 100a through 100d and the master MSP 300. The master MSP 300 and the solution transaction server 200 are combined into a single global MSP 400.

The relation between one of the local MSPs 100a through 100d and the master MSP 300 is not defined by a specific criterion such as geography, culture, or language. For example, in terms of geography, when one master MSP 300 and a plurality of local MSPs 100a through 100d exist within a nation, the master MSP 300 may act as a local MSP in a global perspective. That is, the master MPS 300 may serve as both the master MSP and the local MSP. While FIG. 2 shows that only one master MSP 300 exists within the entire system 1000 for convenience's sake, an upper master MSP 300 may be present.

It is also assumed that there is no restriction to the type and range of content or services being shared and transacted through the local MSPs 100a through 100d and the content and services include all intangible property that can be transacted via a network. Metadata is used between MSPs as a global standard for contents. The metadata refers to data specifically and objectively describing content classified according to a standard content classification system. For example, the metadata may include, but is not limited to, the title, file type, size, genre, length, language, creation date, owner, and price of the content. The global sharing of metadata allows transaction of contents through the solution transaction server 200 and global distribution of contents. More specifically, each of the local MSPs 100a through 100d includes a local meta-database (DB) storing metadata in the language of a local area in which content originates and creates a metadata in a universal language, i.e., global metadata that can be used across the entire global area. The solution transaction server 200 receives the metadata in universal language and registers the received metadata in a global meta-DB. The metadata is connected to a global meta-DB in the master MSP 300 and converted into local languages for the local MSPs 100a through 100d linked to the master MSP 300 for storage. The converted metadata are shared with the local MSPs 100a through 100d, thereby enabling the global distribution of content.

Figure 3:
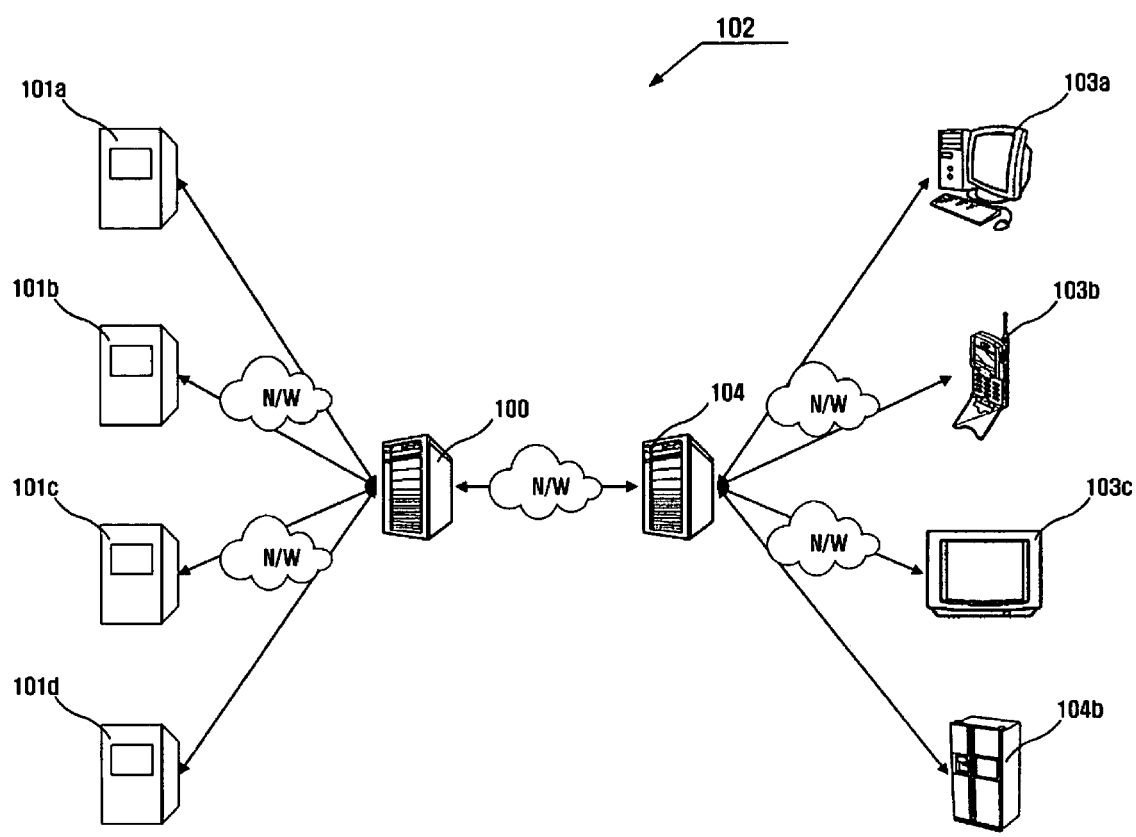
FIG. 3 shows an example of a local content transaction system according to an embodiment of the present invention.

FIG. 3 shows an example of a local content transaction system 102 according to an exemplary embodiment of the present invention. Referring to FIG. 3, the local content transaction system 102 includes at least one content provider server 101a through 110d creating a content consisting of video, image, icon, sound, or a combination of all or some of them, a local MSP 100 connecting to the content provider servers 101a through 110d via the Internet or other network and receiving the created content, at least one terminal 103a through 103d paying the local MSP 100 a predetermined fee for receiving streaming or download services for the content through a predetermined network provided by a telecommunications service provider server 104. However, the present invention is not limited to a telecommunications service provider and one of ordinary skill in the art would recognize that any type of service provider may be used to perform this function.

Here, the network provided by the telecommunications service provider server 104 may be one of various types of networks such as wired/wireless Internet, wired/wireless broadcasting networks, optical networks, wired/wireless telephony network, etc. Thus, the terminals 103a through 103d may include, but are not limited to, various devices such as a PC, a digital TV, a mobile phone, a personal digital assistant (PDA), and home electronics. However, one of ordinary skill in the art would recognize that any terminal compatible with available content may be used to implement the invention.

Because the local content provider servers 101a through 101d, the telecommunications service provider server 104, and the terminals 103a through 103d can be implemented in any available manner, a detailed explanation thereof will not be given.

Figures 4, 5:
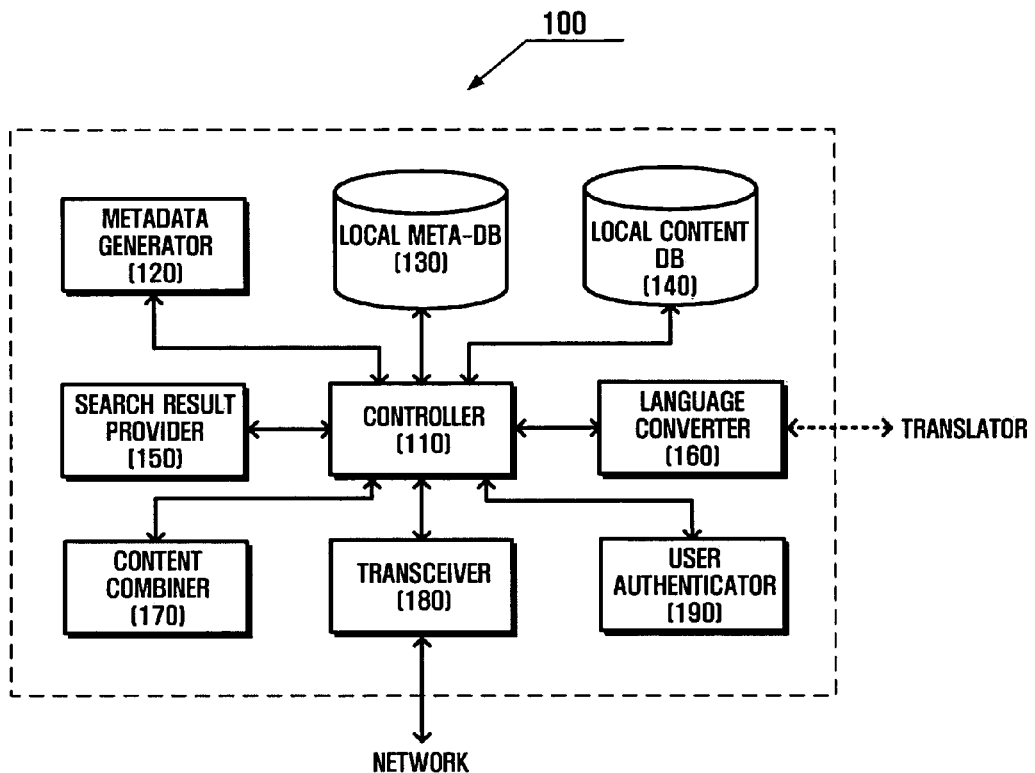
FIG. 4 is a block diagram of a local multi service platform (MSP) according to an embodiment of the present invention.
FIG. 5 shows an example of metadata for each content.

FIG. 4 is a block diagram of a local MSP 100 according to an exemplary embodiment of the present invention. Referring to FIG. 4, the local MSP 100 includes a controller 110, a metadata generator 120, a local meta-DB 130, a local content DB 140, a search result provider 150, a language converter 160, a content combiner 170, a transceiver 180, and a user authenticator 190.

The controller 110 controls the operation of other components in the local MSP 100 and includes a central processing unit (CPU) and an operating system (OS).

The metadata generator 120 uses content received from a content provider (CP) to generate metadata. The metadata refers to data specifically and objectively describing content classified according to a standard content classification system. For example, the metadata may include the title, file type, capacity, play time, bit-rate, genre, language, creation date, owner, and price of the content. When the metadata is recorded in a header of the content as additional information, it is identified while reading the content. When the metadata is not recorded directly in the content, it is identified while previewing the content. In the former case, the metadata may include the tile, genre, language, creation date, owner and price. In the latter case, the metadata may include file type, capacity, bit-rate, and length. The metadata may be generated by the CP and provided separately from the content. In this case, the local MSP 100 may not necessarily include the metadata generator 120.

The thus extracted metadata may be generated in a predetermined format such as a markup language. Examples of the markup language include html (hyper-text markup language), sgml (standard generalized markup language), XML (extensible markup language), and so on.

FIG. 5 shows an example of indicating metadata for each content to a user. Referring to FIG. 5, the content is moving picture, audio, or script. The moving picture refers to a combination of video and audio or video, audio, and script. As evident in a data position column, since audio and script are stored separately from video, audio and script are present in a master MSP while the moving picture (e.g., video) exists in a Korean MSP.

FIG. 6 shows an example in which the metadata of FIG. 5 is described in an Extensible Markup Language (XML) file. The metadata can be efficiently represented in a structured XML document as shown in FIG. 6 and transmitted to another device in the same structured format.

Turning to the exemplary embodiment of FIG. 4, the local meta-DB 130 stores the generated metadata in a structured document such as an XML format.

The local content DB 140 stores contents received from the CP by content. To connect the stored content with the stored metadata, the content may be stored using an identification number shown in FIG. 5 as a file name. In this case, the moving picture, audio, and script can be stored in files named "221-1-501.avi", "221-1-502.mp3", and "221-1-503.doc", respectively.

The search result provider 150 stores local metadata and global metadata received from the solution transaction server (200 of FIG. 2) ("overall metadata") in the local meta-DB 130 and provides a search result that matches a query from a terminal's user, i.e., an end user, to the terminal. For example, when the user queries for metadata whose genre is drama, the search result provider 150 provides metadata whose genre is drama to the user among the overall metadata. The overall metadata collectively include global metadata and metadata for local areas converted from the global metadata by the master MSP 300.

That is, the local metadata refers to metadata converted into a plurality of languages required for the local MSPs 100 registered and connected to the solution transaction server 200. Metadata converted into a plurality of languages may exist for content from the same source.

The language converter 160 translates the metadata generated by the metadata generator 120 into a universal language to register content with the solution transaction server 200 while converting content other than visual data (video, image, icon, etc.), such as audio and script, stored in the local content DB 140 into a universal language. This conversion may be performed using automatic translation or by transmitting original metadata to and receiving the converted metadata from an external translator.

The audio data in the content is converted into universal language through dubbing (recording). Because it is complicated to convert it into a universal language, this process may be omitted. While it is more efficient to directly dub audio data into another local language in the master MSP 300, it is assumed in this exemplary embodiment that the audio data is converted into a universal language.

The transceiver 180 transmits the converted metadata and content provided by the CP and stored in the local content DB 140 to the solution transaction server 200 while respectively receiving the shared overall metadata and content (image, audio, script, etc.) other than video content from the solution transaction server 200 and the master MSP 300. Upon request from the solution transaction server 200, the transceiver 180 also transmits video content to another local MSP or receives video content from another local MSP. The transceiver 180 receives a search query from a terminal's user and transmits (downloads) or streams a specific content to the terminal's user. Alternatively, the transceiver 180 may receive video data content and transmit this with the other content received, but in this exemplary embodiment this is not done in order to reduce the excess transmission and storage of the typically large video content size.

The user authenticator 190 determines whether the terminal's user has the right to access a specific content and authenticates the user having the right to access the content. User authentication may be performed by entering an ID/password or using any method that can identify the user. The existence of the access right can be determined according to whether payment has been made for each content. However, various other payment methods such as post-payment and periodic payment may be used according to the type of agreement between the terminal's user and the local MSP.

The content combiner 170 combines video content received from another local MSP with converted audio content provided by the master MSP 300 or combines source audio content with script in order to create a final content formatted according to a local language. In this way, the local MSP 100 combines video, audio, and script together before transmission to the user. Alternatively, the local MSP 100 may transmit video separately from audio to the user. In this case, a user's play device synchronizes the video and audio for playing.

Figure 7:
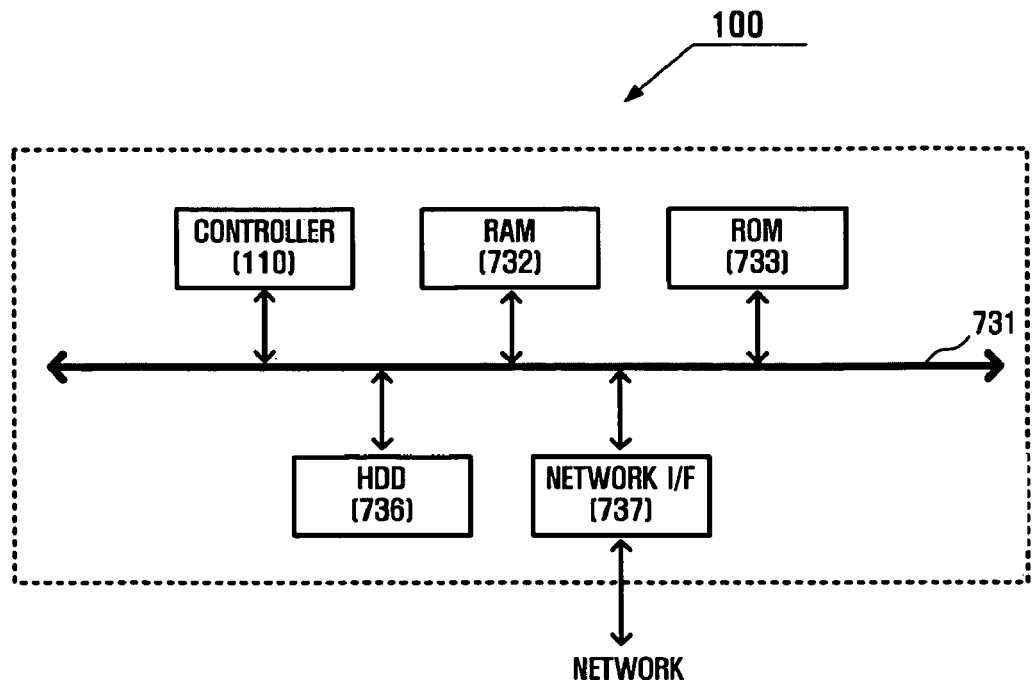
FIG. 7 is a block diagram of the local MSP of FIG. 4 implemented using physical blocks.

The local MSP 100 organized in logical blocks as shown in FIG. 4 can also be implemented using physical blocks as shown in FIG. 7. Referring to FIG. 7, the local MSP 100 includes a controller 110 including a CPU, and a random access memory (RAM) 732, a read-only memory (ROM) 733, a hard disk drive (HDD) 736 and a network interface (I/F) 737 connected to the controller 110 via a bus 731.

The controller 110 reads various programs prestored in the ROM 733 and executes the various programs in the RAM 732 to perform the same operations as the metadata generator 120, the search result provider 150, the language converter 160, the content combiner 170, and the content authenticator 190 according to the various programs.

More specifically, the local MSP 100 executes the same operation as the components shown in FIG. 4 according to the various programs prestored in the ROM 733. Alternatively, program storage media storing the various programs may be installed into the local MSP 100 to perform the operations.

The program storage media storing the various programs may be implemented as any type of package media, such as for example, flexible disks, CD-ROMs, DVDs, or semiconductor memories or magnetic disks, etc. in which a variety of programs are temporarily or permanently stored. In addition, storage means for storing the program storage media may include wired or wireless communication media such as for example, LAN or internet, any communication interfaces such as for example, routers or modems, and so on.

While the transceiver 180 includes a physical network interface (I/F) 737, it is a broad term that encompasses hardware and software required to transmit and receive data such as a Transport Control Protocol (TCP)/User Datagram Protocol (UDP) layer and an Internet Protocol (IP) layer that are overlying layers realized in software. The local meta-DB 130 and the local content DB 140 may be understood as at least one region of the HDD 736.

Figure 8:
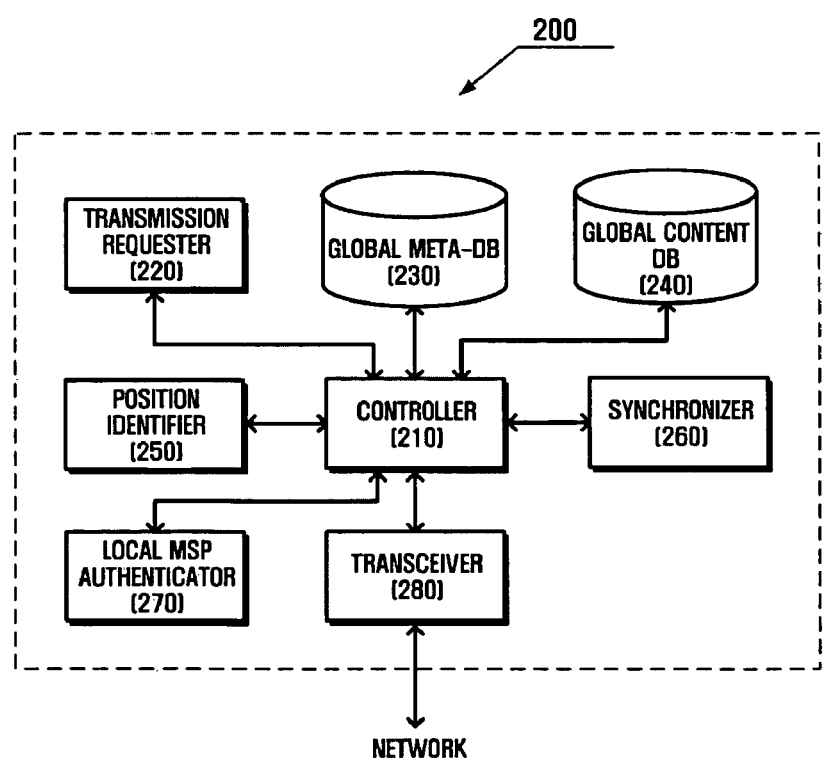
FIG. 8 is a block diagram of a solution transaction server according to an embodiment of the present invention.

FIG. 8 is a block diagram of a solution transaction server 200 according to an exemplary embodiment of the present invention. Referring to FIG. 8, the solution transaction server 200 includes a controller 210, a transmission requester 220, a global meta-DB 230, a global content DB 240, a position identifier 250, a synchronizer 260, a local MSP authenticator 270, and a transceiver 280.

The controller 210 controls the operation of other components in the solution transaction server 200 and includes a central processing unit (CPU) and an operating system (OS).

The synchronizer 260 periodically synchronizes the global meta-DB 230 with the global meta-DB 330 in the master MSP 300. That is, the synchronizer 260 allows metadata present only in the global meta-DB 230 (metadata transmitted from the local MSP 100 and stored) to be stored in the global meta-DB 330 while allowing metadata present only in the global meta-DB 330 (metadata converted by the master MSP 300) to be stored in the global meta-DB 230.

The global meta-DB 230 stores metadata converted into universal language and received from the local MSP 100 and metadata converted by the master MSP 300 and received through the transceiver 280. The global content DB 240 temporarily stores content (except for video content in this exemplary embodiment) received from the local MSP 100.

The local MSP authenticator 270 determines whether the local MSP 100 requesting transaction has the right to access a specific content and authenticates the local MSP 100 having the right to access the content. Like in the user authentication, local MSP authentication may be performed by entering an ID/password or electronic signature and any method that can identify a device or administrator, without limitations. The existence of the access right can be determined according to whether payment has been made for each content, which is, however, for illustration only. Rather, various other payment methods such as post-payment and periodic payment may be used according to the type of agreement between the terminal's user and the local MSP.

The position identifier 250 identifies the position where content requested by the authenticated local MSP 100 is stored (specific MSP or Uniform Resource Identifier (URI) of the MSP). For example, the position can be identified by metadata associated with requested content that is transmitted upon request for purchase of content from the local MSP 100.

A transmission requester 220 requests a local MSP holding the specific content or the master MSP 300 to open a link with the local MSP 100 requesting the content.

The transceiver 280 transmits the metadata to the master MSP 300 or receives the metadata from the master MSP 300. In addition, the transceiver 280 receives the metadata converted into converted into universal language and content other than video content and transmits the content temporarily stored in the global content DB 240 to the local MSP 100. Further, the transceiver 280 receives the request for purchase of the content from the local MSP 100 and provides the metadata synchronized with and stored in the global meta-DB 230 to local MSPs connected to the solution transaction server 200.

The solution transaction server 200 organized in logical blocks as shown in FIG. 8 can be implemented using physical blocks as shown in FIG. 7. Those skilled in the art will readily be able to physically implement the solution transaction server 200 without repetitive explanation.

Figure 9:
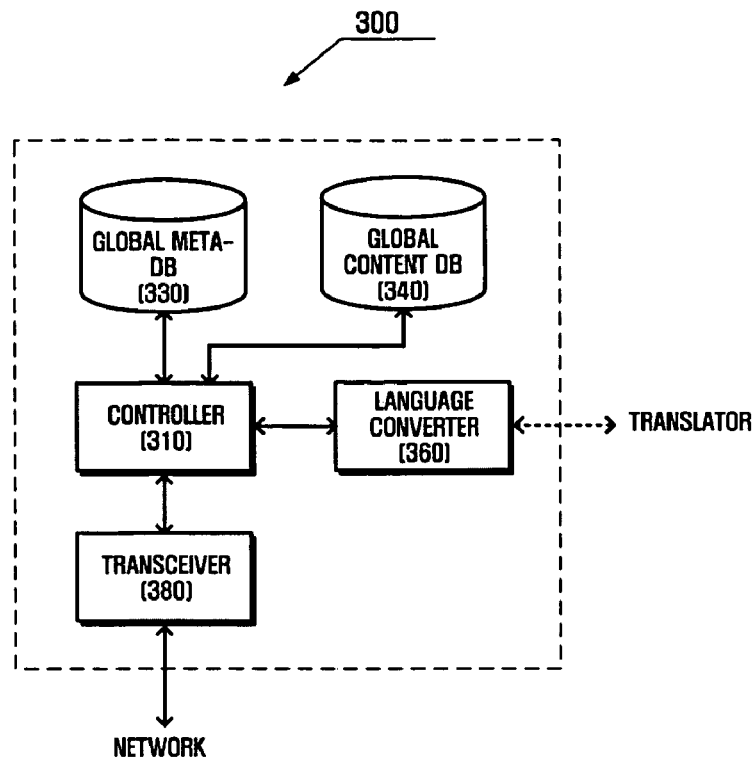
FIG. 9 is a block diagram of a master MSP according to an exemplary embodiment of the present invention.

FIG. 9 is a block diagram of a master MSP 300 according to an exemplary embodiment of the present invention. Referring to FIG. 9, the master MSP 300 includes a controller 310, a global meta-DB 330, a global content DB 340, a language converter 360, and a transceiver 380.

The controller 310 controls the operation of other components in the master MSP 300 and includes a central processing unit (CPU) and an operating system (OS).

The global meta-DB 330 stores metadata in a universal language received from the solution transaction server 200, i.e., global metadata as well as metadata in local languages obtained by the language converter 360. The metadata written in various languages for the same content and the global metadata are collectively referred to as "overall metadata."

The global content DB 340 stores content (except for video content) received from the solution transaction server 200 as well as content in local languages generated by the language converter 360.

The language converter 360 converts the received metadata in universal language into metadata in local languages while translating the received content (except for video content)

into content in local languages. For example, content converted into local languages may mean dubbed content in the local languages (audio) or a script translated into the local languages (script). The conversion may be performed by automatically recognizing letters or sound or receiving an input of an external translator or voice actor.

Here, the local languages refer to all languages required by local MSPs connected to the solution transaction server 200. For example, when the Korean, Chinese, Japanese, and U.S. local MSPs are registered with and connected to the solution transaction server 200, the universal language can be English and the local languages may include Korean, Chinese and Japanese.

The transceiver 380 transmits the converted metadata and content (except for video content) from the solution transaction server 200. Upon request from the solution transaction server 200, the transceiver 380 also transmits the metadata converted into local language to the solution transaction server 200 and the content (except for video content) to the corresponding local MSP.

The master MSP 300 implemented using logical blocks as shown in FIG. 9 can be implemented physically as shown in FIG. 7. Those skilled in the art will readily be able to physically implement the master MSP 300 without repetitive explanation.

Figure 10:
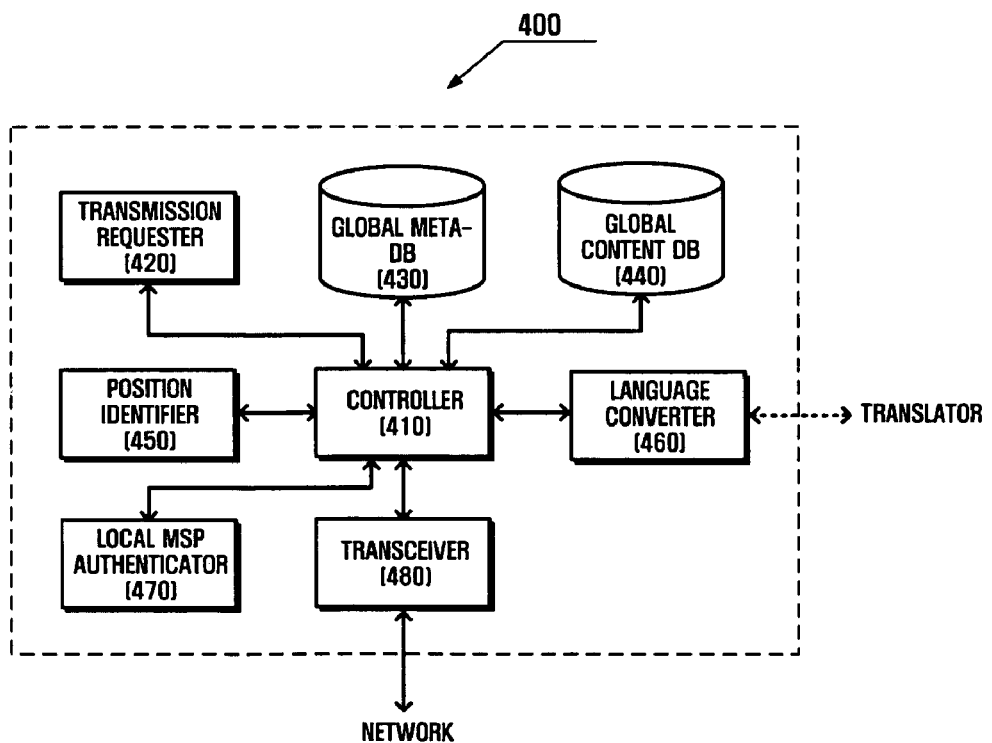
FIG. 10 is a block diagram of a global MSP according to an embodiment of the present invention.

While it is described above that the solution transaction server 200 and the master MSP 300 are separate systems, both of them may be combined into a single global MSP 400. FIG. 10 is a block diagram of a global MSP 400 according to an exemplary embodiment of the present invention. Referring to FIG. 10, the global MSP 400 includes a controller 410, a transmission requester 420, a global meta-DB 430, a global content DB 440, a position identifier 450, a language converter 460, a local MSP authenticator 470, and a transceiver 480.

Thus, the transmission requester 420, the position identifier 450, and the local MSP authenticator 470 perform the same functions as their counterparts shown in FIG. 8. The global meta-DB 430, the global content DB 440, and the language converter 460 performs the same functions as their counterparts shown in FIG. 9. The transceiver 480 performs a combination of functions of the transceivers 280 and 380. Transmission and reception between the transceivers 280 and 380 may be excluded from the function of the transceiver 480. The controller 410 controls the operations of other components in the global MSP 400.

Figure 11:
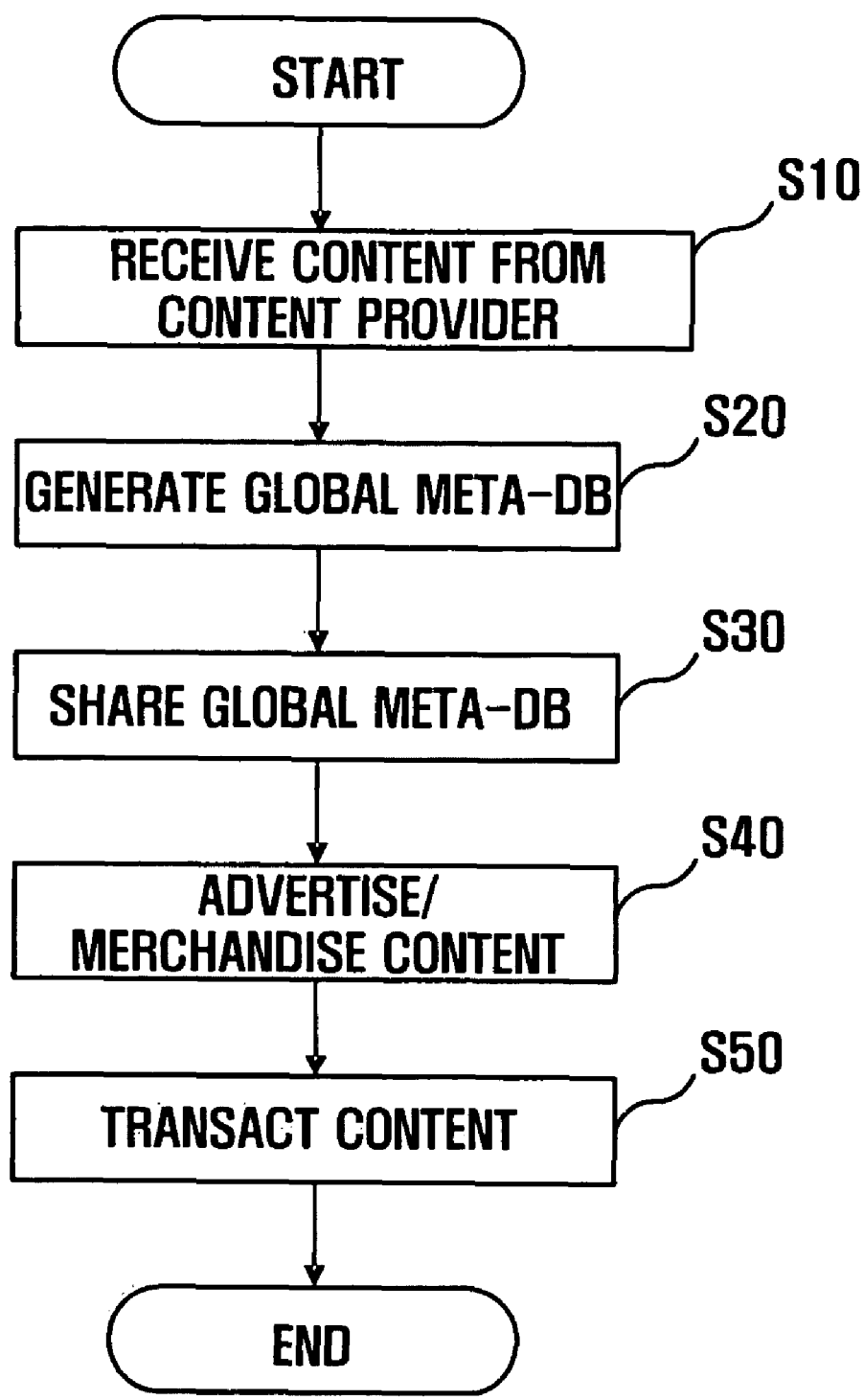
FIG. 11 is a schematic flowchart illustrating the entire digital content transaction process according to an embodiment of the present invention.

FIG. 11 is a schematic flowchart illustrating the entire digital content transaction process according to an exemplary embodiment of the present invention. Referring to FIG. 11, the entire process includes the steps of a local MSP 100 receiving digital content from at least one CP in an local area covered by the local MSP 100 (S10), generating global metadata from local metadata associated with the digital content (S20), sharing the overall metadata, i.e., the global metadata and the local metadata in real time (S30), advertising/merchandising the content for each local area (S40), and transacting global content between a consumer and the local MSP 100 (S50).

The step S10 includes collecting and integrating contents existing separately for each industry on the local MSP 100. In this case, the local MSP 100 may receive and store the collected content data. Alternatively, the local MSP 100 may receive only information about the content and provides the received information to a consumer while storing the content data and transmitting the stored data directly to an end user when transaction occurs.

The step S20 involves converting local metadata for content held by each local MSP 100 into universal language such as English and providing the converted metadata, i.e., global metadata to the solution transaction server 200 and the solution transaction server 200 transmitting the global metadata to the master MSP 300 and the master MSP 300 generating local metadata for each local area from the global metadata.

In the step S30, the overall metadata existing in the master MSP 300 are synchronized with the solution transaction server 200 and sharing the overall metadata among the solution transaction server 200 and all local MSPs 100. The step S40 includes each local MSP 100 periodically searching the overall metadata through an interface provided by the solution transaction server 200 and advertising/merchandising a global content to a terminal's user, i.e., an end user subscribing to the local MSP 100.

The step S50 includes terminating the transaction by the solution transaction server 200 processing all matters such as billing and copyright concerns when a end user subscribing to each local MSP 100 searches an electronic catalog for a global content through an interface of the local MSP 100 and purchases desired content. The local MSP 100 uses metadata to generate the electronic catalog. As a simple example, the electronic catalog can be generated in the format as shown in FIG. 5. However, it will be readily apparent to those skilled in the art that the electronic catalog may be generated in a more complicated form to better represent the effect of advertising/merchandising for content.

Figure 12:
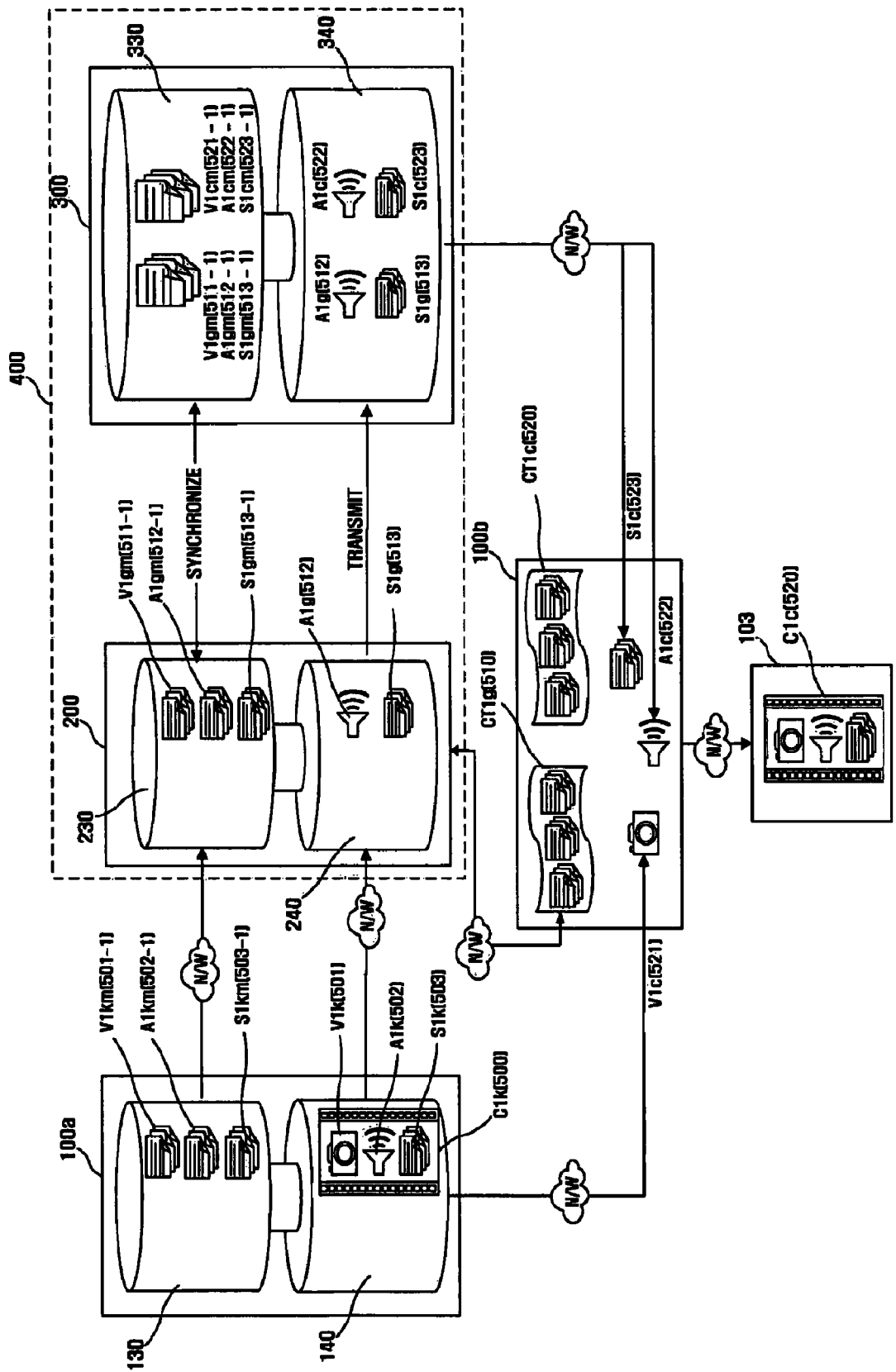
FIGS. 12 and 13 respectively show a system and method for globally distributing digital content and services according to detailed embodiments of the present invention.
Figure 13:
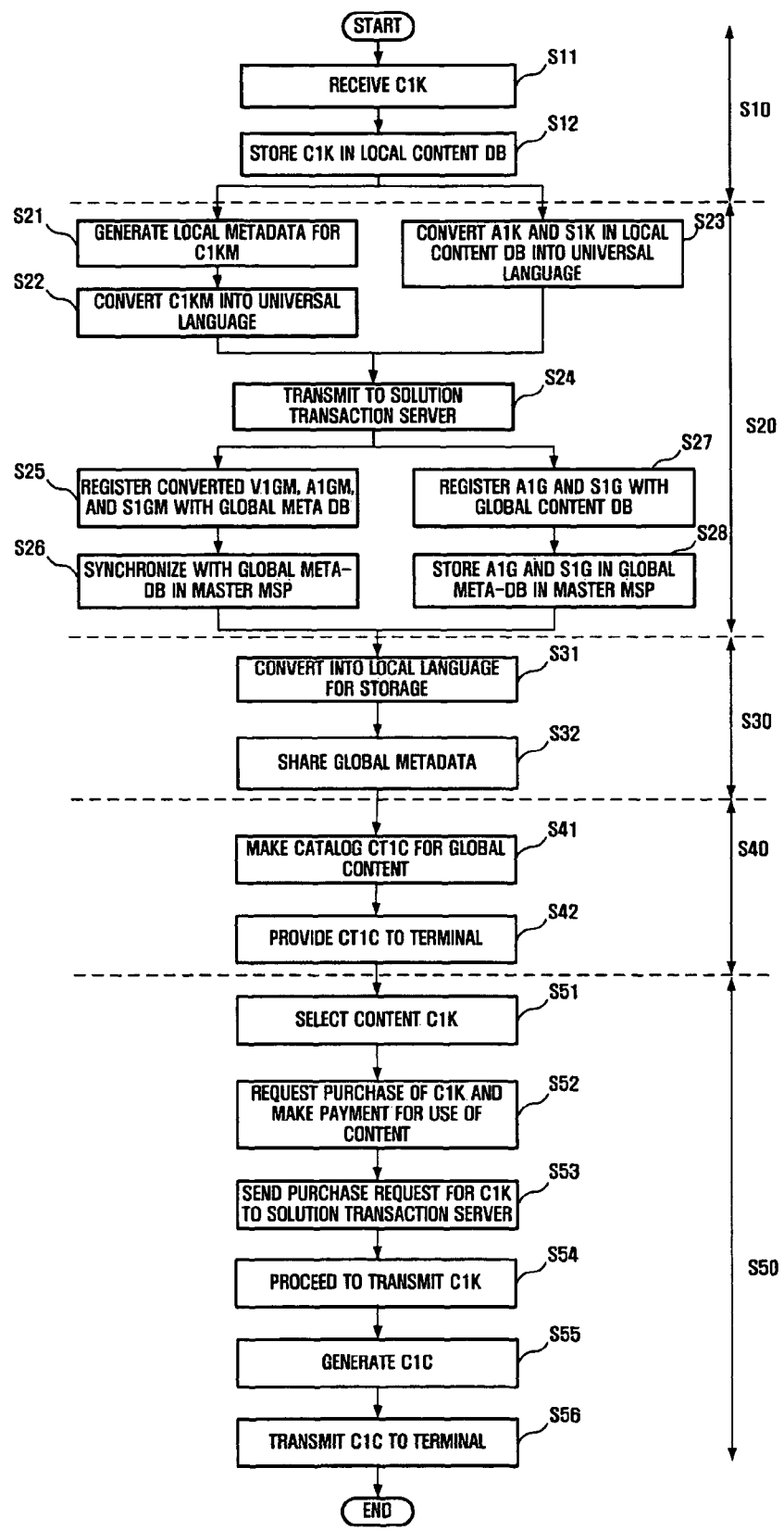

FIGS. 12 and 13 respectively show a system and method for globally distributing digital content and service according to detailed exemplary embodiments of the present invention. FIGS. 12 and 13 show an example of distributing moving picture content between Korea and China using different languages in real time. Here, it is assumed that a consumer in China purchases Korean moving picture content. The entire operations of MSPs 100a, 100b, and 300 globally distributing digital content based on metadata and a method for efficiently and globally distributing large-capacity moving picture content by separately transmitting sources of video, audio, and script will now be described in more detail with reference to FIGS. 12 and 13.

Referring to FIG. 12, when an end user's terminal 103 in China searches global content through a Chinese local MSP 100a and sends a purchase request for selected Korean moving picture content C1k 500 to the local MSP 100a, the local MSP 100a performs global content transaction between a local MSP 100b and a master MSP 200 through a solution transaction server 200 and transmits content converted into a Chinese language to the terminal 103. The distribution of global content is based on globally shared overall metadata and global connection among MSPs 100a, 10b, and 300.

Referring to FIGS. 12 and 13, in step S10, content is received. More specifically, in the step S11, a Korean local MSP 100a receives moving picture content C1k 500 from a CP. In the step S12, the Korean local MSP 100a segments the received content C1k 500 into video V1k 501, audio A1k 502, and script data S1k 503 and stores the video V1k 501, the audio A1k 502, and the script data S1k 503 in a local content DB 140.

In step S20, global metadata is generated. More specifically, in step S21, the local MSP 100a generates metadata V1km 501-1, A1km 502-1, and S1km 503-1 associated with the video V1k 501, the audio A1k 502, and the script data S1k 503 and stores the metadata V1km 501-1, A1km 502-1, and S1km 503-1 in a local meta-DB 130. In step S22, the stored metadata V1km 501-1, A1km 502-1, and S1km 503-1 are converted into universal language to generate global metadata V1*gm* 511-1, A1*gm* 512-1, and S1*gm* 513-1.

In step S23, the original audio data A1*k* 502 and the script data S1*k* 503 stored in the local content DB 140 are converted into universal language to generate audio data A1*g* 512 dubbed in universal language and script data S1*g* 513 converted into universal language.

The audio data is converted into universal language through dubbing (recording). Because it is complicated to convert the audio data into a universal language, this process may be omitted. While it is more efficient to directly dub audio data into another local language in the master MSP 300, it is assumed in the present exemplary embodiment that the audio data is converted into universal language.

Then, in step S24, the global metadata 511-1, 512-1, and 513-1 and the converted audio data and script data A1*g* 512 and S1*g* 513 are transmitted to the solution transaction server 200.

The solution transaction server 200 registers the global metadata V1*gm* 511-1, A1*gm* 512-1, and S1*gm* 513-1 with a global meta-DB 230 in step S25 and synchronized with a global meta-DB 300 in a master MSP 300 in step S26. In step S27, the solution transaction server 200 registers the received audio data A1*g* 512 and script data S1*g* 513 with the global content DB 240 and transmits the same to the master MSP 300. In step S28, the master MSP 300 stores the received audio data A1*g* 512 and script data S1*g* 513 in the global content DB 340. The video data V1*k* 301 remains stored in the local MSP 100*a* in order to reduce server and network cost and prevent overload due to repetitive transmission of large-capacity files.

Next, the step S30 of sharing overall metadata including global metadata and local metadata will now be described. In step S 31, the master MSP 300 converts the audio data A1*g* 512 and script data S1*g* 513 received from the solution transaction server 200 into local languages of nations subscribing to the local MSPs 100*a* and 100*b* (including at least Chinese language) and stores the same in a global content DB 340. The converted audio and script are denoted by A1*c* 522 and S1*c* 523, respectively. The master MSP 300 also converts the global metadata V1*gm* 511-1, A1*gm* 512-1, and S1*gm* 513-1 into local languages and stores the converted metadata 521-1, 522-1, and 523-1 in a global meta-DB 330.

Because the global meta-DB 230 in the solution transaction server 200 is frequently synchronized with the global meta-DB 330 in the master MSP 300, the converted metadata 521-1, 522-1, and 523-1 can also be used in the solution transaction server 200.

In step S32, the solution transaction server 200 shares the overall metadata including the converted metadata 521-1, 522-1, and 523-1 and the global metadata 511-1, 512-1, and 513-1 with the local MSPs 100*a* and 100*b*. The sharing can be performed simply by the local MSPs 100*a* and 100*b* periodically downloading the overall metadata from the solution transaction server 200.

The step S40 of advertising/merchandising content represented by the overall metadata includes steps S41 and S42. In the step S41, the local MSP 100*b* uses the overall metadata received from the solution transaction server 200 to make electronic catalogs CT1*g* 510 and CT1*c* 520, each consisting of a list of contents. In the step S42, the local MSP 100*b* transmits the catalogs on line to the terminal's user 103.

In step S50, transaction of global content is performed between a consumer and the local MSP 100*b*. The local MSP 100*a* or 100*b* segments original content owned into video, audio, and script and stores the audio and script data and their associated metadata in the master MSP 300 acting as a global hub, thereby enabling global sharing of content. On the other hand, video data constituting a significant percentage of total content capacity remains stored in the local MSP holding a source and transmitted to another local MSP as needed. The digital content transaction method of the present invention can make efficient use of resources within a network while providing a terminal's user with efficient downloading and stable service quality, compared to a conventional method by which video data are transmitted together with audio and script For transmission of the video data, a cache memory in a receiving local MSP may be used. For example, when average data transfer speed between local MSPs 100*a* and 100*b* is less than predetermined threshold, that is, when there is a request for the same video data (e.g., V1*k*) between the remote local MSPs more than a predetermined number of times, the video data can be stored in a cache memory of a receiving local MSP for more than a predetermined period of time, instead of being separately stored for each local MSP.

In step S51, a user of the terminal 103 subscribing to the local MSP 100*b* receives the global content catalog CT1*c* 520 (Chinese version) provided by the local MSP 100*b*, searches the received global content catalog, and selects desired content. In step S52, the user transmits a purchase request for the selected content C1*k* 500 to the local MSP 100*b* and makes a payment for use of the content. In this case, the user may search the catalog CT1*g* 510 in a language other than Chinese (e.g. English) for desired content and make a purchase request for the selected content.

Figure 14:
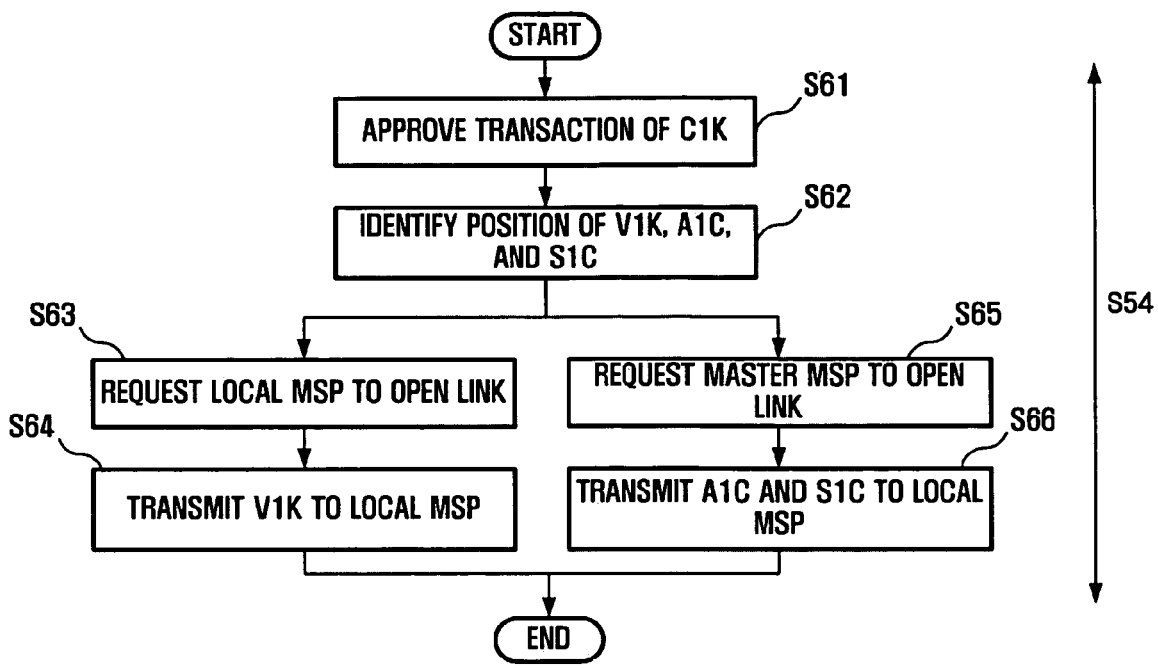
FIG. 14 is a detailed flowchart illustrating the step S54 shown in FIG. 13.

In step S53, the local MSP 100*b* transmits a purchase request containing the metadata 521-1, 522-1, and 523-1 for the selected content C1*k* 500 to the solution transaction server 200 in step S53. In step S54, the solution transaction server 200 performs a predetermined process to transmit the content C1*k* 500. FIG. 14 is a detailed flowchart illustrating the step S54. Referring to FIG. 14, first, in step S61, the solution transaction server 200 determines whether to approve a transaction for the content C1*k* 500.

The approval is determined according to the type of agreement between the local MSP 100*b* and the solution transaction server 200. The agreement may specify various payment terms such as prepayment, post-payment, and periodic payment. In step S62, when transaction of the content C1*k* 500 is approved, the solution transaction server 200 uses position information contained in the metadata 521-1, 522-1, and 523-1 to identify positions where actual data V1*k* 501, A1*c* 522, and S1*c* 523 represented by the metadata 521-1, 522-1, and 523-1 exist.

Then, in step S63, to transmit the content V1*k* 501 to the local MSP 100*b*, the solution transaction server 200 requests the local MSP 100*a* where the V1*k* 501 exists to open a link with the local MSP 100*b*.

In step S64, the local MSP 100*a* transmits the V1*k* 501 to the local MSP 100*b*.

In this case, the sending local MSP 100*a* may change the quality of V1*k* 501 according to the type of agreement between the local MSP 100*b* and the solution transaction server 200. The quality of video data may vary according to the resolution, frame rate, bit rate, and so on. Recent video coding techniques provide scalability, that is, different video streams with a variety of resolution levels, frame rates, or bit rates can be easily generated from a single coded video stream. Scalability with respect to a resolution level can be supported by wavelet coding or multi-layer coding. Scalability with respect to a frame rate can be supported by MCTF (Motion Compensated Temporal Filtering), or UMCTF (Unconstrained MCTF). In addition, scalability with respect to a bit rate can be supported by FGS (Fine Granular Scalability) coding, or embedded quantization. The local MSP 100a may easily change the quality of video by truncating a portion of scalable video stream.

In step S65, to transmit the A1c 522 and S1c 523 to the local MSP 10b, the solution transaction server 200 requests the master MSP 300 where the A1c 522 and S1c 523 exist to open a link with the local MSP 100b. In step S66, the master MSP 300 transmits the A1c 522 and S1c 523 to the local MSP 100b.

When the transaction is approved, the solution transaction server 200 notifies the approval of transaction to the local MSP 100b so that the local MSP 100b can provide a virtual data space for storing received data.

Turning to FIG. 13, in step S55, the local MSP 100b that receives the actual data V1k 501, A1c 522, and S1c 523 combines them together to create final content C1c 520 set for a Chinese area. The final content C1c 520 may be created by combining the video 501 and the audio 522 dubbed into a Chinese language or the video 501, the original audio A1k 502, and the Chinese script 523. After creating the final content in this way, the local MSP 100b may notify the user of the terminal 103 that it has been prepared to download or stream the content to the user of the terminal 103. In step S56, upon receipt of request for downloading or streaming from the user, the local MSP 100b transmits the final content C1c 520 to the terminal 103.

As described above, the present invention allows an end user in China to request the purchase of Korean moving picture content existing in Korea through the local MSP 100b in China to which he/she subscribes and purchase the moving picture content converted into a Chinese language in real time, thereby easily providing the end user with global content services, which were conventionally impossible.

Based on the foregoing, these exemplary embodiments of the present invention have several advantages.

First, these exemplary embodiments of the present invention makes global distribution of digital content and services quicker and easier. These embodiments enable a MSP to integrate content and services that were conventionally provided separately for each culture, nation, or language for global distribution while allowing a consumer to quickly identify and access global content and services. Thus, the service provider can easily extend the scope of its business beyond a restricted area to cover the whole world through a MSP. That is, the use of a MSP allows the scope of a solution business to extend beyond a single nation to cover the global area, thus enabling real-time global distribution of digital content and services while creating a new opportunity for a global solution business.

Second, these exemplary embodiments of the present invention minimize the dependence of digital content services on terminal and allows a consumer to select one of multiple terminals compatible with a MSP and access desired service when connected to the MSP, thereby increasing consumer convenience. For example, conventionally, when a consumer desires to use specific content existing in a service network for mobile phones, he/she must use only a mobile phone to access the service network because he/she cannot identify the existence of the content nor access the service network through a device other than the mobile phone. However, the use of a MSP allows a terminal to be connected to any other terminal that satisfies compatibility requirements provided by the MSP, thereby alleviating the restriction to terminals. Furthermore, when a consumer of the MSP uses a home network or office network that enables networking between devices, it is possible to activate content downloaded from the MSP on another terminal.

Third, these exemplary embodiments of the present invention provide more efficient global content distribution by allowing a large-capacity data file to be transmitted separately from other files. The content transmission method of the present invention reduces the burden of excessive server cost on a service provider while saving a network cost in terms of an end user by downloading content using a cache server upon repetitive transmission of the same content from remote local MSPs. The method also minimizes the burden of network overload, which may occur when global transmission of large-capacity content is activated, on a telecommunications service provider.

Fourth, these exemplary embodiments of the present invention improve a consumer's accessibility to digital content services. While a conventional digital content distribution method requires a consumer to search for content, a MSP actively collects global content and services and provides the consumer with the collected content and services. For example, conventionally, to search for and purchase desired content and service, a consumer needs to access the Internet, find service providers providing the desired content and service in a search site, and access a web site of each of the service providers to compare their services. According to exemplary embodiments of the present invention, however, the consumer may simply turn on a DTV and access the MSP holding a list of various contents systematically classified to quickly search for and purchase the desired content.

Fifth, these exemplary embodiments of the present invention provide a value-added solution, thereby increasing the consumer convenience and satisfaction for services. Services provided by the MSP include supplying a value-added solution going beyond simple integration of contents. For example, payment through PC or mobile phone is integrated with TV home shopping to provide a single solution. Conventionally, a consumer purchases desired product through other terminal such as telephone while watching a home shopping program on a TV. That is, search of products is performed independently of a purchasing procedure. Conversely, the use of MSP allows a consumer to search for and purchase a product at a time while watching a DTV, thereby increasing consumer convenience.

While the present invention has been particularly shown and described with reference to exemplary embodiments thereof, it will be understood by those of ordinary skill in the art that various changes in form and details may be made therein without departing from the spirit and scope of the present invention as defined by the following claims. Therefore, it is to be understood that the above-described embodiments have been provided only in a descriptive sense and will not be construed as placing any limitation on the scope of the invention.

What is claimed is:

1. A method for globally sharing content in local area by interworking with a global multi service platform (MSP), the method comprising:

receiving original content existing in each local area from at least one content provider;

generating first local language metadata of a first local language from the received original content;

converting the first local language metadata into universal language metadata of a universal language;

transmitting the universal language metadata and at least a portion of the original content from a first local MSP to the global MSP;

converting the universal language metadata into second local language metadata of a second local language; and transmitting the second local language metadata from the global MSP to a second local MSP, wherein the original content comprises at least one of a video, an image, an icon, and sound.

2. The method of claim 1, when the received content can be divided into a plurality of contents, further comprising segmenting the received content into a plurality of contents.

3. The method of claim 2, wherein when the plurality of contents comprise first content having a small capacity and second content having a large capacity, the portion of the original content transmitted to the global MSP comprises first content.

4. The method of claim 3, wherein the original content is moving picture content, the first content includes audio and script, and the second content includes video.

5. The method of claim 2, wherein the metadata is generated for each of the plurality of contents.

6. The method of claim 1, wherein the metadata is described in a markup language.

7. The method of claim 1, further comprising receiving overall metadata from the global MSP, the overall metadata comprising at least one of metadata in the universal language and metadata in at least one local language converted from the metadata that are received from one or more different local MSPs.

8. A method for globally transacting content in a local area by interworking with a global multi service platform (MSP), the method comprising:

receiving, by a first local MSP, overall metadata from a global MSP, wherein the overall metadata comprises universal language metadata of a universal language and local language metadata of at least one local language;

selecting at least one of contents represented by the overall metadata;

sending a purchase request for the selected content to the global MSP;

receiving the selected content from the global MSP;

providing the received selected content to a terminal;

converting the universal language metadata into second local language metadata of a second local language; and transmitting the second local language metadata from the global MSP to a second local MSP, wherein the at least one of contents comprises at least one of a video, an image, an icon, and sound.

9. The method of claim 8, further comprising creating electronic catalogs for advertising/merchandising of content represented by the received overall metadata for use in selecting contents.

10. The method of claim 8, further comprising determining whether a user of the terminal has the right to access the selected content.

11. The method of claim 8, wherein when the selected content consists of a plurality of contents comprising first contents having a small capacity and second contents having a large capacity, receiving selected content further comprises receiving selected content from a local MSP, wherein the first contents are received from the global MSP and the second contents are received from the local MSP.

12. The method of claim 11, wherein the requested content is moving picture content, the first contents comprise audio, and the second contents comprise video.

13. The method of claim 8, wherein the providing of the received content to the terminal comprises downloading or streaming the received content to the terminal.

14. A method for globally sharing and transacting content existing in a local multi service platform (MSP) by interworking with at least one local MSP, the method comprising:

receiving universal language metadata in a universal language and at least a portion of content in a first local language corresponding to that of a local MSP source and represented by the metadata from the local MSP source;

converting the universal language metadata into second language metadata written in at least one second local language corresponding to that of at least one receiving local MSP, including a requesting local MSP;

converting the received content from the first local language into content in the second local language of the requesting local MSP;

providing overall metadata comprising at least the second language metadata to the requesting local MSP;

receiving a request for content represented by the overall metadata from the requesting local MSP of the at least one local MSP; and transmitting the requested content to the requesting local MSP;

wherein the content comprises at least one of a video, an image, an icon, and sound.

15. The method of claim 14, further comprising determining whether the requesting local MSP has the right to access the requested content.

16. The method of claim 14, wherein the transmitting of the requested content comprises, when the requested content consists of a plurality of contents, transmitting second content having a large capacity among the plurality of contents directly from a local MSP while transmitting first content with small capacity from a global MSP holding the first content.

17. The method of claim 16, wherein the requested content is moving picture content, the first content comprises audio, and the second content comprises video.

18. The method of claim 16, wherein the transmitting of the requested content further comprises identifying information about a position where the requested content is stored, the identifying information being contained in the overall metadata describing the content.

19. A method for globally sharing and transacting content in local area, comprising:

receiving content from a content provider in the local area;

registering the received content with a global area;

generating first local language metadata in a first local language using the received content and converting the first local language metadata into global metadata in a universal language;

converting the global metadata into various local languages and generating second local language metadata comprising metadata of all the various local languages corresponding to each local MSP connected to a global MSP;

sharing the global metadata and the second local language metadata;

receiving a transaction request for content represented by the shared global and second local language metadata; and selecting the requested content from the registered contents and transmitting the selected content;

wherein the content comprises at least one of a video, an image, an icon, and sound.

20. A first local multi service platform (MSP) for globally sharing content in local area by connecting to a global MSP, the first local MSP comprising:

a processor controlling:

a receiving unit receiving original content existing in each local area from at least one content provider;

a metadata generating unit generating first local language metadata in a first local language using the received original content;

a language converter converting the first local language metadata into universal language metadata of a universal language; and a transmitter transmitting the universal language metadata and at least a portion of the original content from the first local MSP to the global MSP;

wherein the original content comprises at least one of a video, an image, an icon, and sound, and the global MSP converts the universal language metadata into second local language metadata of a second local language corresponding to that of a second local MSP, and transmits the second local language metadata from the global MSP to the second local MSP.

21. A local multi service platform (MSP) for globally transacting content in local area by connecting to a global MSP, the local MSP comprising:

a processor controlling:

a means for receiving overall metadata from the global MSP, wherein the overall metadata comprises universal language metadata of a universal language and local language metadata of at least one local language;

a means for allowing a terminal to select one of contents represented by the overall metadata;

a means for sending a purchase request for the selected content to the global MSP;

a means for receiving the requested content from the global MSP;

a means for providing the received content to the terminal;

a means for converting the universal language metadata into second local language metadata of a second local language; and a means for transmitting the second local language metadata from the global MSP to a second local MSP, wherein the one of contents comprises at least one of a video, an image, an icon, and sound.

22. A global multi service platform (MSP) for globally sharing and transacting content for each local area existing in a local multi service platform (MSP) by interworking with at least one local MSP, the global MSP comprising:

a processor controlling:

a means for receiving universal metadata in a universal language and at least a portion of content represented by the universal metadata from a local MSP source;

a means for converting the universal metadata into local metadata written in a predetermined local language of a receiving local MSP;

a means for converting the received content into content in the predetermined local language;

a means for providing overall metadata including at least the converted metadata to at least one local MSP;

a means for receiving a request for content represented by the overall metadata from a local MSP of the at least one local MSP; and a means for transmitting the requested content to a requesting local MSP;

wherein the content comprises at least one of a video, an image, an icon, and sound.

23. The global MSP according to claim 22, further comprising:

a means for receiving local metadata in a local language and at least a portion of the content represented by the metadata from at least one local MSP; and a means for converting the received local metadata into universal metadata.

* * * * *